No. 792,326. PATENTED JUNE 13, 1905.
P. E. FLOARE.
MEAT OR POULTRY HOLDER.
APPLICATION FILED MAY 3, 1904.
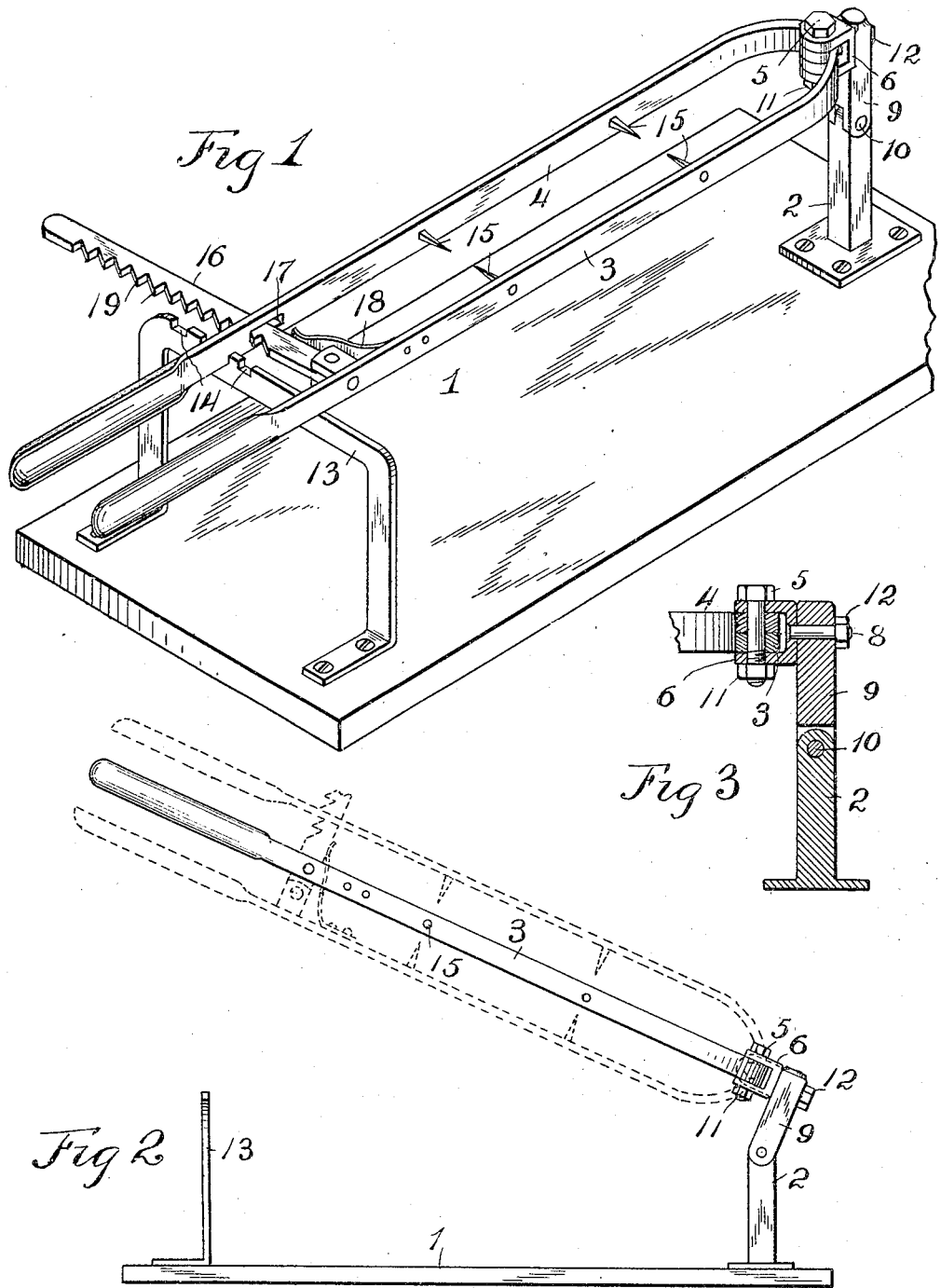
WITNESSES:
R E Hamilton
W E Eylar
INVENTOR,
Paul E. Floare,
By Warren D House
His Attorney, No. 792,326.

Patented June 13, 1905.

UNITED STATES PATENT OFFICE.

PAUL E. FLOARE, OF KANSAS CITY, MISSOURI.

MEAT OR POULTRY HOLDER.

SPECIFICATION forming part of Letters Patent No. 792,326, dated June 13, 1905.

Application filed May 3, 1904. Serial No. 206,210.

*To all whom it may concern:*

Be it known that I, PAUL E. FLOARE, a citizen of the United States, residing at Kansas City, in the county of Jackson and State of Missouri, have invented certain new and useful Improvements in Meat or Poultry Holders, of which the following is a specification.

My invention relates to improvements in meat and poultry holders.

The object of my invention is to provide a device by which meat—such as pieces of roast-beef, hams, roasted fowls, &c.—may be firmly held while being sliced. My invention provides also means by which the meat so held may be changed in position, so that different parts thereof may be sliced with facility.

My invention provides, further, a device by which the meat held thereby may be readily elevated for the insertion thereunder of a platter or other receptacle for catching the gravy or sliced pieces.

Other novel features are hereinafter fully described and claimed.

In the accompanying drawings, illustrative of my invention, Figure 1 is a perspective view of the meat-holder. Fig. 2 is a side elevation view showing in solid lines the clamping-arms in the raised position. In this view the said arms are shown in dotted lines rotated to a position at right angles to the position denoted by the solid lines. Fig. 3 is a vertical central sectional view of the pivoted ends of the meat-clamping arms and the parts to which said arms are pivotally connected.

Similar characters of reference denote similar parts.

1 denotes the base, comprising a horizontal plate of any suitable material, such as wood, stone, metal, or other material. On the upper side of said base adjacent one end is secured the lower end of a vertical support 2, comprising, preferably, a metallic post, to the upper end of which are pivotally connnected two meat-engaging members 3 and 4, comprising, preferably, two metallic arms pivotally mounted at one set of ends on a vertical bolt 5, which holds the arms together and permits them being adjusted toward and from each other. The members or arms 3 and 4 are held between the arms of a U-shaped bracket 6, the arms of which are provided, respectively, with vertical holes in which is mounted the bolt 5. The vertical part of the bracket 6 is rotatively mounted on a horizontal bolt 8, mounted in a hole in the upper end of a vertical bar 9, the lower end of which is pivotally connected with the upper end of the support 2 by a horizontal pin 10. The bolt 5 has mounted on its lower end a nut 11, which bears upon the lower arm of the bracket 6, and the bolt 8 is provided on one end with a nut 12, which bears upon the outside of the bar 9. The free ends of the members 3 and 4 are adapted to rest upon the horizontal portion of a support 13, having the shape of an inverted letter U, the lower ends thereof being secured to the upper side of the base 1. In the upper or horizontal portion of said support are provided one or more notches 14, adapted to receive one of the members 3 or 4 and prevent lateral movement of the members 3 and 4 while supporting the meat. On the inner sides of said members are provided pointed projections 15, which are adapted to enter the meat and prevent its movement relative to the members 3 and 4. To one member—as, for instance, member 3—is pivoted in any desirable manner one end of a horizontally-swinging locking member 16, comprising, preferably, a plate of metal, which extends through a transverse hole 17 in the member 4 and is provided on one edge with teeth adapted to engage with and hold the member 4. A spring 18, having one end secured to the member 3, bears upon the locking member 16 and forces it normally into engagement on its toothed edge with the member 4. The hole 17 is long enough so that the member 16 may be swung therein a distance sufficient to permit disengagement of the teeth (denoted by 19) from the member 4, and thus permit the adjustment toward or from each other of the members 3 and 4.

In operating my invention the locking member is released, as above described, from the member 4, after which the members 3 and 4 are swung at their free ends far enough apart to permit the insertion between them of the meat to be held. The roast fowl, beef, or other piece of meat to be sliced is then placed between the members 3 and 4 and the free ends of the said members forced toward each other until they tightly clamp between them the meat, the pointed projections 15 entering the meat and preventing its slippage. The locking member 16 will then be caused by the spring 18 to engage and hold the member 4, thus preventing separation accidentally of the members 3 and 4. The meat held by the members 3 and 4 may then be sliced off from the upper side thereof until the meat above the members 3 and 4 is cut away. The members 3 and 4 may then be swung vertically to the position shown in Fig. 2 and then rotated on the bolt 8 with the bracket 6 to a position in which the members 3 and 4 and meat held thereby will be the reverse from the original position. The members 3 and 4 may then be swung vertically downward until they rest upon the support 13, after which the meat may be sliced from the upper side thereof.

It will be noted that by the described pivotal connection of the members 3 and 4 with the support 2 the said arms or members may be swung in two planes at right angles to each other—that is, vertically and horizontally—and at the same time they may be rotated, the axis of rotation being at right angles to the axis of the bolt 5 and also at right angles to the pin 10. This pivotal connection of the members 3 and 4 permits movement of them in any direction, thus enabling the operator to position the meat in the manner best suited to his purpose.

My invention may be modified in many ways without departing from its spirit.

Having thus described my invention, what I claim, and desire to secure by Letters Patent, is—

1. In a meat and poultry holder, the combination with a base, of two supports thereon, two meat-holding arms pivoted to each other at one set of ends, said set of pivoted ends being connected by a universal joint with one of said supports, and the other set of ends being adapted to rest upon and movable toward and from the other support, and releasable means for locking the arms in a given position relative to each other.

2. In a meat and poultry holder, the combination with a base, of two supports mounted thereon one having a horizontal portion provided in its upper side with a series of notches, two arms pivoted together at one set of ends, the free set of ends being adapted to rest upon the notched support, one arm being adapted to engage with said notches, and the pivoted ends of said arms having a universal-joint connection with the other support, a toothed lever pivotally connected to one arm and adapted to engage and lock with the other arm, and means for retaining said lever in such engagement.

3. The combination with a base, of a post mounted vertically on said base, a support on said base having a horizontal portion provided with a series of notches in its upper side, two arms pivotally connected with each other, and adapted to rest upon the notched support, a bar pivoted to the post so as to swing in a vertical plane, a member connected to the pivoted ends of said arms and pivoted to said bar so as to swing in a plane at right angles to the plane of movement of the bar, and a releasable locking means for holding the arms in a position relative to each other in which they may be adjusted.

In testimony whereof I affix my signature in presence of two witnesses.

PAUL E. FLOARE.

Witnesses:
WARREN D. HOUSE,
HENRY F. ROSE.